US012257540B2

(12) United States Patent
Mees

(10) Patent No.: US 12,257,540 B2
(45) Date of Patent: Mar. 25, 2025

(54) FILTER ELEMENT

(71) Applicant: Hydac Filtertechnik GmbH, Sulzbach/Saar (DE)

(72) Inventor: Harald Mees, Lebach (DE)

(73) Assignee: HYDAC FILTERTECHNIK GMBH, Sulzbach/Saar (DE)

(*) Notice: Subject to any disclaimer, the term of this patent is extended or adjusted under 35 U.S.C. 154(b) by 323 days.

(21) Appl. No.: 17/909,818

(22) PCT Filed: Jul. 27, 2021

(86) PCT No.: PCT/EP2021/071045
§ 371 (c)(1),
(2) Date: Sep. 7, 2022

(87) PCT Pub. No.: WO2022/028961
PCT Pub. Date: Feb. 10, 2022

(65) Prior Publication Data
US 2023/0241540 A1    Aug. 3, 2023

(30) Foreign Application Priority Data
Aug. 4, 2020  (DE) ............... 10 2020 004 704.1

(51) Int. Cl.
*B01D 24/00*   (2006.01)
*B01D 46/24*   (2006.01)
*B01D 46/52*   (2006.01)

(52) U.S. Cl.
CPC ....... *B01D 46/521* (2013.01); *B01D 46/2403* (2013.01); *B01D 2201/0415* (2013.01); *B01D 2201/12* (2013.01)

(58) Field of Classification Search
CPC .... B01D 29/21; B01D 29/111; B01D 46/521; B01D 46/2411; B01D 46/0001; B01D 2201/0415; B01D 29/232; F02M 35/0245
USPC ........................................................ 210/348
See application file for complete search history.

(56) References Cited

U.S. PATENT DOCUMENTS

| | | | |
|---|---|---|---|
| 6,368,506 B1 | 4/2002 | Gebert et al. | |
| 6,949,155 B1 | 9/2005 | Lang et al. | |
| 7,462,282 B2 | 12/2008 | Mees et al. | |
| 10,478,760 B2* | 11/2019 | Klein | B01D 29/235 |
| 11,033,838 B2* | 6/2021 | Lang | B01D 29/21 |
| 11,066,311 B2* | 7/2021 | Dani | C02F 1/283 |

(Continued)

FOREIGN PATENT DOCUMENTS

| | | |
|---|---|---|
| DE | 197 46 751 | 4/1999 |
| DE | 199 33 163 | 2/2001 |

(Continued)

OTHER PUBLICATIONS

International Search Report (ISR) issued Oct. 6, 2021 in International (PCT) Application No. PCT/EP2021/071045.

*Primary Examiner* — Long T Tran
*Assistant Examiner* — James J Kim
(74) *Attorney, Agent, or Firm* — Wenderoth, Lind & Ponack, L.L.P.

(57) ABSTRACT

A filter element has a filter mat web (10) with free, mutually adjacent web ends (12) joined along a joint (16) forming a hollow body. The joint (16) is made of at least one connecting part (18), which is provided with groove-shaped receiving channels (20, 22). Each of the receiving channels is used to receive one web end (12) of the filter mat (10).

21 Claims, 2 Drawing Sheets

(56) References Cited

U.S. PATENT DOCUMENTS

| | | | |
|---|---|---|---|
| 2005/0284807 A1* | 12/2005 | Mees | B01D 29/111 |
| | | | 210/493.1 |
| 2008/0257483 A1 | 10/2008 | Mees et al. | |
| 2008/0276584 A1* | 11/2008 | Driesen | B01D 46/10 |
| | | | 219/121.64 |
| 2012/0097593 A1* | 4/2012 | Maier | B29C 66/12441 |
| | | | 210/232 |
| 2013/0015121 A1* | 1/2013 | Mees | B01D 29/111 |
| | | | 219/121.64 |
| 2014/0131270 A1* | 5/2014 | Zeiler | B01D 63/14 |
| | | | 210/493.1 |

FOREIGN PATENT DOCUMENTS

| | | | | |
|---|---|---|---|---|
| DE | 102 35 275 | 2/2004 | | |
| DE | 10 2010 051 756 | 5/2012 | | |
| EP | 2 545 975 | 1/2013 | | |
| EP | 2545975 B1 * | 10/2014 | | B01D 29/111 |
| JP | 2013-688 | 1/2013 | | |
| WO | 2010/146037 | 12/2010 | | |
| WO | 2017/102008 | 6/2017 | | |

\* cited by examiner

FILTER ELEMENT

FIELD OF THE INVENTION

The invention relates to a filter element, at least having a filter mat web, with the free, mutually adjacent web ends of the mat web joined along a joint, forming a hollow body.

BACKGROUND OF THE INVENTION

DE 199 33 163 A1 relates to a tubular filter element for the filtration of fluids using a filter mat, the facing ends of which are secured in position by a connecting device. The connecting device at least partially overlaps the ends, is designed as a connecting strip, is pushed onto the filter mat ends in the manner of a clip, and holds the ends together for a thermal welding process using an ultrasonic welding device. The welding connection requires no filler metal.

Furthermore, the known welding process achieves a weld edge seal to prevent fiber migration, for instance retaining inserted glass fibers of the filter medium in the filter mat. In this way, a high-strength connection can be made avoiding adhesives, which are regularly harmful to the environment, for closing the filter mat web and setting it up to form a tubular filter element. No curing time for any adhesive is required and the element can be used immediately.

Furthermore, DE 102 35 275 A1 discloses a filter cylinder, the outside of which rests against a fluid-permeable support tube, through which cylinder the fluid to be filtered can flow from the cylinder's inside and which cylinder is formed from a filter mat web which has a succession of pleats resting against each other at least in certain areas and whose two free ends are joined at a longitudinal seam joint to form an annular body. Because the annular body can be turned inside out after the formation of an outer weld seam connecting the ends of the filter mat web such that the weld seam is on the inside of the annular body turned inside out when the filter element is in the operating state, the weld can be produced in a simple manner on the outside of the element and, by turning the pleated filter mat web inside out, the weld seam forming a weak point of the filter cylinder is then placed on the inner circumference of the filter element and thus protected from stress, in particular in the form of protection against unintentional buckling of the filter mat web.

The known solution does not require a connecting clip to be welded and neither does it require any filler metal. However, to protect the weld seam, which is kept simple in this way, from excessive stresses which could possibly lead to failure of the weld seam, two retaining lugs projecting inwards are formed on the inner circumferential side of the support tube. The retaining lugs form a U-shaped cross-section with each other, in which, once the weld seam is held in a protective manner, can rest its downstream filter pleats on both sides in a force-relieving manner on the retaining lugs.

Welding a filter mat web to create a tight connection between the adjacent longitudinal edges requires a relatively high heat input, which can result in the ends to be welded together being thermally stressed to such an extent that the welded joint loosens again even under low fluid stress, or the welded joint effectively cannot be created at all. If, on the other hand, the thermal input is too low, it may not even be possible to achieve a reliable welded joint along the entire length of the longitudinal end webs to be joined. Accordingly, for both known solutions, the respective welding processes have to be performed very carefully.

SUMMARY OF THE INVENTION

Based on this prior art, the invention therefore addresses the problem of further improving the known solutions in such a way that a secure connection of the filter mat web ends is achieved in a hollow-bodied, in particular hollow-cylindrical, filter element at correspondingly reduced manufacturing costs.

A filter element according to the invention basically solves this problem.

In that in accordance with the invention, the joint provided for the two adjacent web ends of the filter mat web is made of at least one connecting part, which is provided with groove-shaped receiving channels. The receiving channels are each used to receive one web end of the filter mat. The web ends can be secured in a predeterminable position without gluing or welding. In this way, the filter mat web is secured in a defined way, forming a hollow body or hollow cylinder. Because the filter mat web and its individual filter layers are mainly of plastic materials and can be compressed, the ends can be inserted with appropriate pretension into the respective groove-shaped receiving channel, where the web end is then secured based on its inherent elasticity. The filter mat web can also extend from one end of the web to the other with a certain amount of pretension on the outer circumference, which increases the pretension of the engagement of the web ends in the groove-shaped receiving channels and in that way further promotes secure fastening. Because there is no welded joint between the ends of the web, no harmful welding fumes can be produced, which would otherwise have to be removed from the welding area by means of complex extraction systems, resulting in correspondingly higher manufacturing costs. To further increase the tightening moment of the web ends in the respective assignable receiving grooves, the grooves can be provided with an adhesive that cures with the channel and is selected from appropriate environmentally friendly adhesive materials. To ensure a reliable application of the adhesive, it is also possible to heat the ends of the web to cement the layered plastic materials together to form a closed adhesive application surface on the outside.

As indicated above, the ends of the web inserted into the receiving channels can be used to generate a pretension or tensile stress, in particular along the outer circumference of the filter mat web with its filter pleats, keeping the pleats in their respective positions, i.e., even when fluid (unfiltered matter) flows against the mat web, the adjacent filter pleats cannot unintentionally fold over one another, which would significantly reduce the filter performance because the pleats are no longer available for flow in a blocking manner.

In a particularly preferred embodiment of the filter element according to the invention, provision is thus made for a receiving channel to be provided in the connecting part for each of the two web ends, which receiving channels extend in parallel to each other away from the interior of the filter element and outwards toward the environment. To this end, the web parts of the connecting device extend in parallel to a part of the last pleat at the respective web mat end and additionally support them while relieving the engagement area in the respective grooves. In a further advantageous embodiment, the end pieces of the web ends engage with the two receiving channels in a latching manner.

In a preferred exemplary embodiment, the receiving channels have a step-shaped offset in the direction of the hollow body formed in such a way that, viewed along the circumference, the web ends open into the respective receiving channel at different levels relative to each other. This renders post-construction protection easy to implement. Thus, a filter element designed in this way can be used exclusively in a filter device for receiving filter elements designed in this way.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are general views and are not to scale.

DETAILED DESCRIPTION OF THE INVENTION

Figure 1:
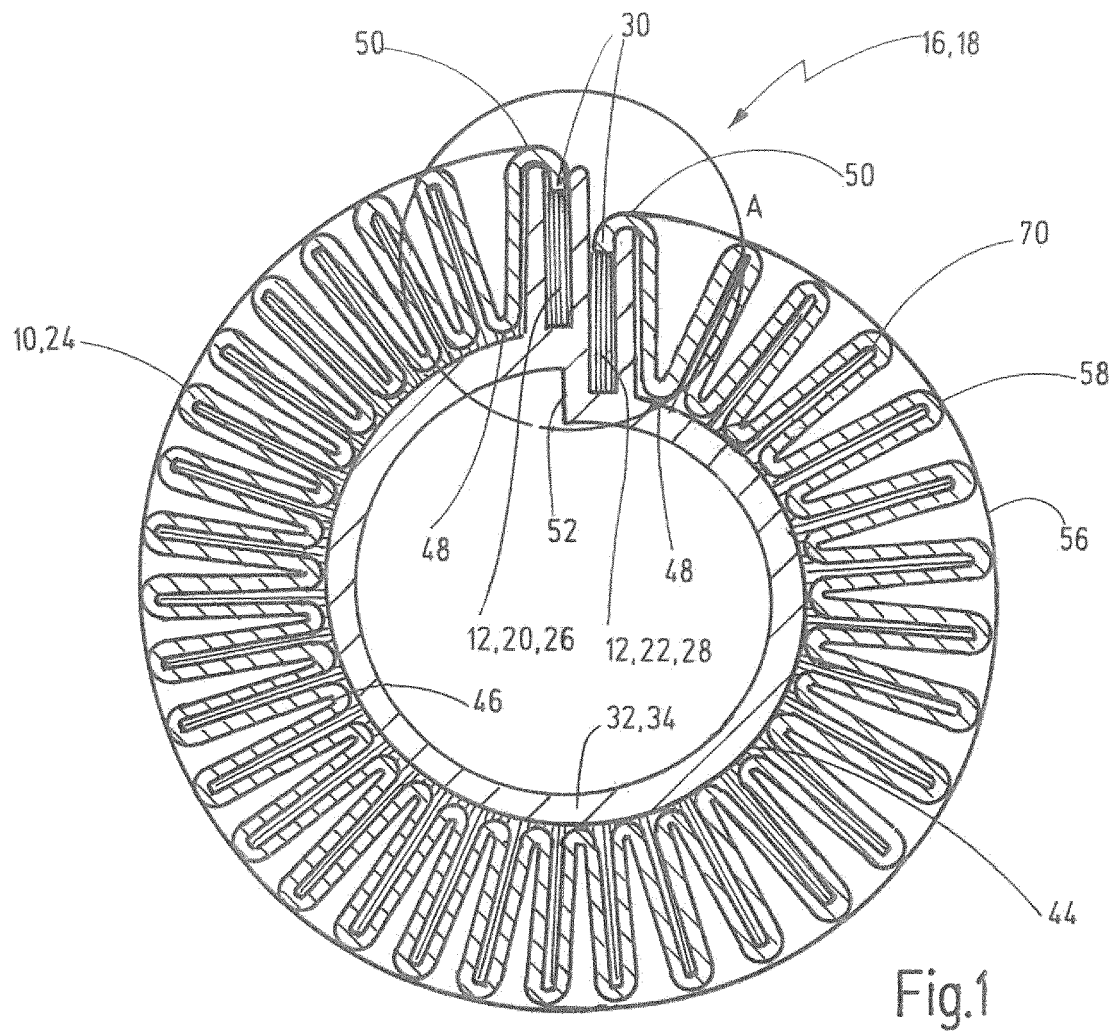
FIG. 1 is a schematically simplified, plan view in cross-section of essential parts of a filter element according to an exemplary embodiment of the invention.
Figure 2:
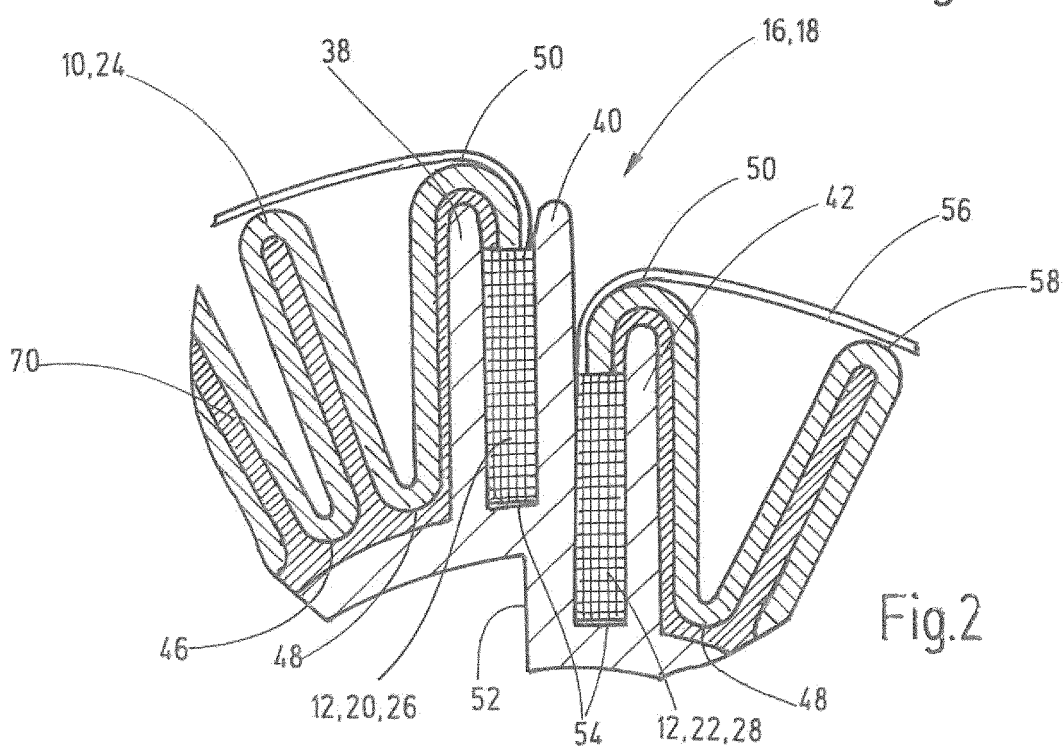
FIG. 2 is a partial and magnified plan view in relation to FIG. 1 and in cross-section of the area designated by A in FIG. 1.

FIGS. 1 and 2 show a cross-section through a filter element according to the invention, having a filter mat web 10. The free, adjacent web ends 12 of the filter mat web 10 are joined to form a hollow body at a joint 16. The joint 16 is formed by a connecting part 18, which is provided with groove-shaped receiving channels 20, 22. Every receiving channel 20, 22 is used to receive one web end 12 of the filter mat web 10.

Laid out flat, the filter mat web 10 is rectangular in shape with two parallel longitudinal sides and two parallel transverse sides that are shorter than the longitudinal sides. Fashioned into a hollow body, the longitudinal sides match the end faces 24 of the filter mat web 10. Viewed in the longitudinal direction, the respective web ends 12 of the filter mat web 10, i.e. their respective transverse ends, are formed as a first strip-shaped end piece 26 and a second strip-shaped end piece 28. The two end pieces 26, 28 may be molded onto the respective end 12 of the filter mat web 10 or prefabricated from thermoplastic material and each welded to the respective end 12 of the filter mat web 10. An edge of the filter material 30 of the filter mat web 10 adjoins the respective end pieces 26, 28 of the filter mat web 10, wherein the filter material 30 interconnects the two end pieces 26, 28. The filter mat web 10 is pleated.

The connecting part 18 is an integral part of an at least partially fluid-permeable support tube 32 for supporting the filter mat web 10. The support tube 32 is made from an almost completely circular tubular body 34, from the circumferential side of which a first rib 38, a second rib 40 and a third rib 42 extend outwards, which are of basically equal length in that direction. The three ribs 38, 40 42 extend in parallel to each other and in the axial direction across at least the perforated area of the tubular body 34 and the entire axial height of the filter mat web 10. A first receiving channel 20 for engaging the first strip-shaped end piece 26 is formed between the first rib 38 and the second rib 40, and a second receiving channel 22 for engaging the second strip-shaped end piece 28 is formed between the second rib 40 and the third rib 42. The respective receiving channel 20, 22 are basically U-shaped when viewed in cross-section. The three ribs 38, 40 42 and at least the part connecting the three ribs 38, 40, 42 of the tubular body 34 in conjunction form the connecting part 18. The respective receiving channels 20, 22 are designed in such a way that at least the respective strip-shaped end piece 26, 28 can be completely accommodated therein in a latching manner.

If the filter mat web 10 is connected to the support tube 32, in which the first end piece 26 is secured in a latching manner in the first receiving channel 20 and the second end piece 28 is secured in a latching manner in the second receiving channel 22, the end facing the tube body 34, of the pleated filter mat web 10 is supported indirectly or directly strip-shaped in the area of the pleat valleys 46 of its filter material, each on the outer circumference 44 of the tube body 34. To this end, the respective end area having the end pieces 26, 28, of the filter mat web 10, as viewed in the direction of the respective end of the respective end area, starting from its last pleat valley 48, first extends in the direction away from the interior of the support tube along the side facing away from the second rib 40, of the first rib 38 and third rib 42 and then opens into the respective receiving channel 20, 22, forming its last pleat crest 50 in the direction of the interior of the support tube.

The tubular body 34, as viewed in cross-section, has a spiral or helical shape while forming a step 52, which connects a strip-shaped area of the smallest radius of the tubular body 34 to a strip-shaped area of the largest radius of the tubular body 34. The second rib 40 extends radially outwards away from the tubular body 34 in a strip-shaped area of the outer circumference 44 of the tubular body 34, in which area the tubular body 34 has its largest radius, such that the second rib 40 is aligned with the step 52 of the tubular body 34 on both sides. The first rib 38 extends outwards away from the tubular body 34 in a strip-shaped area of the outer circumference 44 of the tubular body 34, in which area the tubular body 34 has a radius slightly smaller than the largest radius, such that the free ends of the first rib 38 and second rib 40 are substantially flush with each other. The third rib 42 extends outwards away from the tubular body 34 in a strip-shaped area of the outer periphery 44 of the tubular body 34, in which area the tubular body 34 has a radius slightly larger than its smallest radius. Therefore, the base 54 extending in parallel to the inner circumference of the tube body 34, of the second receiving channel 22 and the free end of the third rib 42 in the direction of the support tube interior each have an offset from the base 54 extending in parallel to the inner circumference of the tube body 34, of the first receiving channel 20 and the free ends of the first rib 38 and second rib 40, respectively. These offsets essentially correspond to each other and to the height of the step 52 of the tubular body 34.

As a result, viewed in the radial direction, the two web ends 12 of the filter mat web 10 open into the respective receiving channel 20, 22 at different levels relative to each other.

On the side facing away from the support tube 32, of the filter mat web 10 an elastically yielding and fluid-permeable jacket film 56 extends between the two end pieces 26, 28 across the pleated filter mat web 10 in such a way that the jacket film 56, resting against all pleat peaks 58 of the pleated filter mat web 10, radially pre-loads the filter mat web 10 in the direction of the tubular body 34 of the support tube 32. For this purpose, the rectangular jacket film 56, laid out flat, at least in the longitudinal direction is shorter than the rectangular filter mat web 10 laid out flat. The pretensioning effect results as soon as the end pieces 26, 28 are secured in the receiving channels 20, 22 of the connecting part 18. The two end pieces 26, 28 may be molded onto the end 12 of the jacket film 56, just as they are molded onto the filter mat web 10, or they may be prefabricated from thermoplastic material and each welded onto the end 12 of the filter mat web 10. The jacket film 56 may be provided with information and/or have a punched hole.

Figure 3:
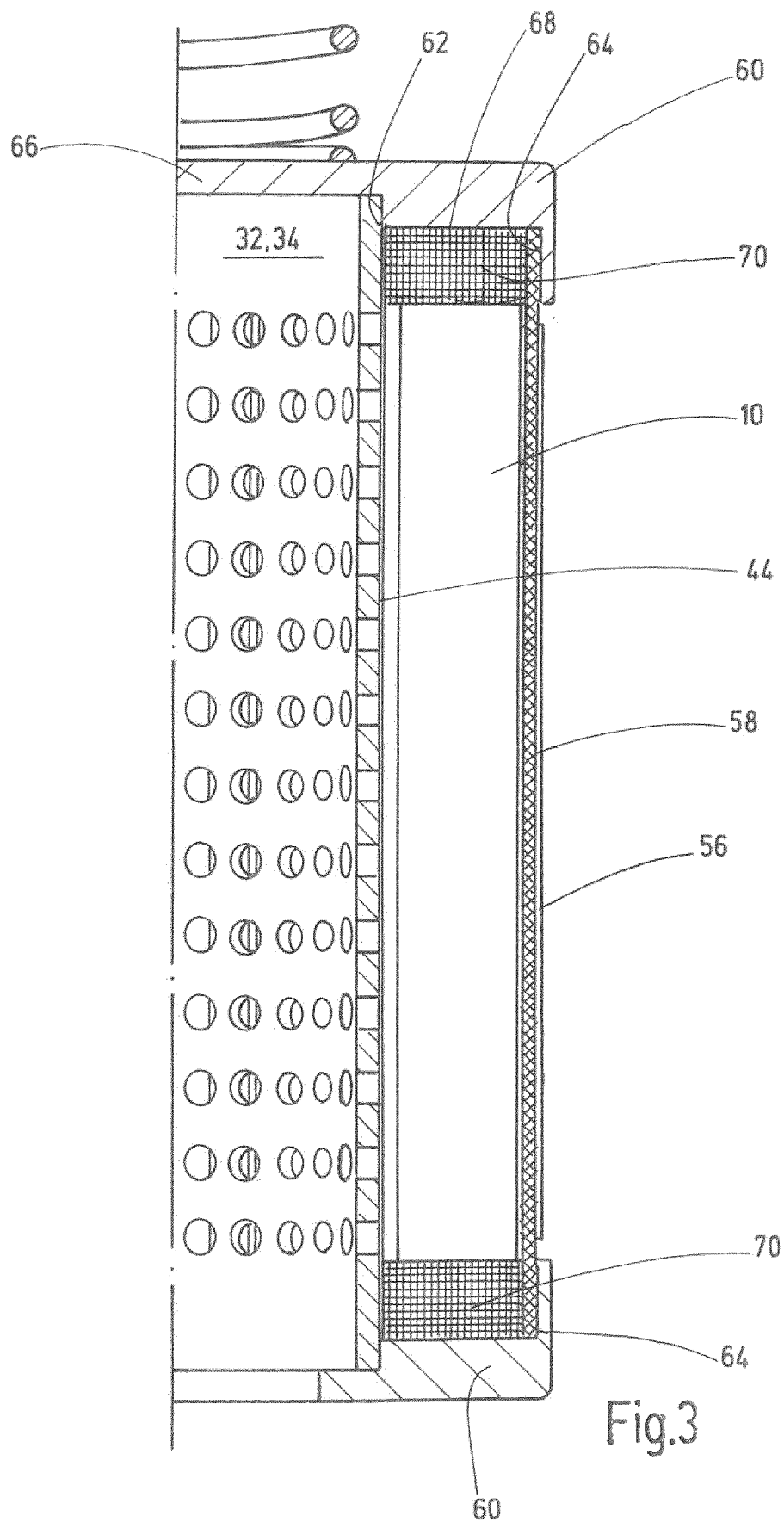
FIG. 3 is a schematically simplified side view in partial longitudinal section of the filter element according to the invention of FIG. 1.

As FIG. 3 shows, the filter mat web 10 is provided with a commonly formed end cap 60 at each of its two opposite, front ends. The axial thickness of the respective end cap 60 increases radially outwards from its longitudinal axis while forming two steps 62, 64, wherein the outer step 64 is formed by a wall 64 extending axially away from a respective disk-shaped end cap base body 66. The wall 64 delimits an annular holder 68 for the respective axial end of the filter mat web 10 radially outwards, which is radially inwards delimited by the respective end cap 60.

If the support tube 32 and the pleated filter mat web 10 are arranged in combination with the jacket film 56 between the two end caps 60, the support tube 32, which is free of perforations in this area, on the outside in the two end areas of its outer circumference comes into contact with the inner step 62 of the respective end cap 60, and the filter mat web 10 comes on its inside into contact on the outside of the support tube 32 and on its outside on the outer step 64, i.e. the wall. The jacket film 56 is formed such that it is spaced apart from the outer wall 64 of the respective end cap 60 in the axial direction.

On the end facing the support tube 32, of the filter mat web 10, an elastic and strip-shaped sealing web 70 is folded into each of the free end edge areas of the lateral surface of the filter mat web 10, which sealing web 70 seals the pleats of the filter mat web 10 from each other and from the first and third ribs, respectively, as well as sealing the filter mat web 10 inwards in the radial direction from the support tube 32, which is free of perforations in this area. The sealing web 70 may be attached to the face edge areas of the side surface of the filter mat web 10 prior to a sealing operation of the filter mat web 10 or after a sealing operation. The sealing web 70 seals the interior of the filter element from the environment when the end caps 70 are in place. It is also conceivable that, alternatively, a sealant is provided which is applied for this purpose to the free end face areas of the filter mat web 10 by means of a proportioning system.

While one embodiment has been chosen to illustrate the invention, it will be understood by those skilled in the art that various changes and modifications can be made therein without departing from the scope of the invention as defined in the claims.

The invention claimed is:

1. A filter element, comprising:
   a filter mat web;
   free, mutually adjacent first and second web ends of the filter mat web being joined along a joint forming the filter mat web into a hollow body, the joint being made of a connecting part provided with groove-shaped receiving channels, each of the receiving channels receiving a respective one of the first and second web ends of the filter mat; and
   a step-shaped offset of the receiving channels relative to each other in a direction of the hollow body such that, viewed along a circumference of the hollow body, the first and second web ends extending into the respective receiving channels at different level positions relative to each other.

2. The filter element according to claim 1 wherein the connecting part extends along an entire axial length of the hollow body of the filter mat web.

3. The filter element according to claim 1 wherein a depth of each respective receiving channel is selected to accommodate the respective one of the first and second web ends formed from a respective last filter pleat of the filter mat web extending into an interior of the hollow body.

4. The filter element according to claim 1 wherein each of the first and second web ends comprises a strip-shaped end piece adjoined at a respective end a longitudinal edge of filter material of the filter mat web.

5. The filter element according to claim 1 wherein the receiving channels extend in parallel to each other away from an interior of the filter element outwardly toward an environment surrounding the filter element.

6. The filter element according to claim 1 wherein the connecting part is an integral component of an at least partially fluid-permeable support tube.

7. The filter element according to claim 6 wherein the filter mat web has pleats extending towards an interior of the hollow body and resting on the support tube.

8. The filter element according to claim 1 wherein a fluid-permeable jacket film is on an outer circumference of the filter mat web, the jacket film allowing the filter mat web to be stretched on a support tube as soon as the first and second web ends are secured in the respective receiving channels of the connecting part.

9. The filter element according to claim 1 wherein the jacket film is elastically yielding.

10. The filter element according to claim 1 wherein each of two opposite axial ends of the filter mat web are provided with an end cap.

11. The filter element according to claim 10 wherein a strip-shaped sealing web is folded into at least one free end face end area of the filter mat web, the sealing web sealing an interior of the filter element with respect to an environment surrounding the filter element when the respective end cap is fitted on the free end face end area.

12. A filter element, comprising:
    a filter mat web;
    free, mutually adjacent first and second web ends of the filter mat web being joined along a joint forming the filter mat web into a hollow body, the joint being made of a connecting part provided with groove-shaped receiving channels, each of the receiving channels receiving a respective one of the first and second web ends of the filter mat; and
    a fluid-permeable jacket film on an outer circumference of the filter mat web, the jacket film allowing the filter mat web to be stretched on a support tube as soon as the first and second web ends are secured in the respective receiving channels of the connecting part.

13. The filter element according to claim 12 wherein the connecting part extends along an entire axial length of the hollow body of the filter mat web.

14. The filter element according to claim 12 wherein a depth of each respective receiving channel is selected to accommodate the respective one of the first and second web ends formed from a respective last filter pleat of the filter mat web extending into an interior of the hollow body.

15. The filter element according to claim 12 wherein each of the first and second web ends comprises a strip-shaped end piece adjoined at a respective end a longitudinal edge of filter material of the filter mat web.

16. The filter element according to claim 12 wherein the receiving channels extend in parallel to each other away from an interior of the filter element outwardly toward an environment surrounding the filter element.

17. The filter element according to claim 12 wherein the connecting part is an integral component of an at least partially fluid-permeable support tube.

18. The filter element according to claim 17 wherein the filter mat web has pleats extending towards an interior of the hollow body and resting on the support tube.

19. The filter element according to claim 12 wherein the jacket film is elastically yielding.

20. The filter element according to claim 12 wherein each of two opposite axial ends of the filter mat web are provided with an end cap.

21. The filter element according to claim 20 wherein a strip-shaped sealing web is folded into at least one free end face end area of the filter mat web (10), the sealing web sealing an interior of the filter element with respect to an environment surrounding the filter element when the respective end cap is fitted on the free end face end area.

* * * * *